(12) United States Patent
Hamann

(10) Patent No.: US 7,416,176 B2
(45) Date of Patent: Aug. 26, 2008

(54) PROCESS AND DEVICE FOR LOCALIZED GRIPPING AND HOLDING OF A THIN, FLEXIBLE PANEL, IN PARTICULAR HAVING A COMPLEX SHAPE

(75) Inventor: Jean-Christophe Hamann, La Baule (FR)

(73) Assignee: Airbus France, Toulouse (FR)

( * ) Notice: Subject to any disclaimer, the term of this patent is extended or adjusted under 35 U.S.C. 154(b) by 286 days.

(21) Appl. No.: 11/053,192

(22) Filed: Feb. 8, 2005

(65) Prior Publication Data
US 2005/0263950 A1 Dec. 1, 2005

(30) Foreign Application Priority Data
Feb. 10, 2004 (FR) .................................. 04 01278

(51) Int. Cl.
*B25B 5/16* (2006.01)
(52) U.S. Cl. .......................................... 269/266; 269/21
(58) Field of Classification Search ................. 269/266, 269/21, 289 R
See application file for complete search history.

(56) References Cited

U.S. PATENT DOCUMENTS

| 4,838,531 | A | * | 6/1989 | Corsi | ........................... 269/21 |
|---|---|---|---|---|---|
| 5,364,083 | A | * | 11/1994 | Ross et al. | ..................... 269/21 |
| 5,457,868 | A | | 10/1995 | Blaimschein | |
| 6,250,619 | B1 | | 6/2001 | Cook et al. | |
| 7,168,898 | B2 | * | 1/2007 | Hamann | ..................... 409/199 |
| 2005/0263950 | A1 | * | 12/2005 | Hamann | ..................... 269/266 |

FOREIGN PATENT DOCUMENTS

EP 0 490 746 A1 6/1992

* cited by examiner

*Primary Examiner*—Lee D Wilson
(74) *Attorney, Agent, or Firm*—Patterson, Thuente, Skaar & Christensen, P.A.

(57) ABSTRACT

A method for locally gripping and holding a thin, flexible panel having a complex, nondevelopable shape. The method includes placing a first surface of the panel against a three-point support system without deforming the surface; applying a plurality of suction cups which are mobile with respect to a reference support onto the surface in an area of the surface to be supported; locking each suction cup in a gripping position with respect to the support without locally deforming the surface of the panel. A device for localized gripping and holding of a thin, flexible panel having a complex, nondevelopable shape is also disclosed.

9 Claims, 4 Drawing Sheets

PROCESS AND DEVICE FOR LOCALIZED GRIPPING AND HOLDING OF A THIN, FLEXIBLE PANEL, IN PARTICULAR HAVING A COMPLEX SHAPE

RELATED APPLICATION

The present application claims priority to French Application No. 04 01278 filed Feb. 10, 2004.

TECHNICAL FIELD

The present invention concerns a process for localized gripping and holding of a thin, flexible panel in an isostatic position, and, in particular, such a panel having a complex shape, which may be nondevelopable.

The invention is particularly useful with respect to any panel shaped part, in particular a metal panel, with a low wall thickness and of unspecified size, which may be large, such as panels for covering an aircraft fuselage.

BACKGROUND ART

Because, on the one hand, of the flexibility and, on the other hand, of possible irregularities in the thickness of such parts, which will hereafter be generally referred to as "panels," problems in aligning surfaces of these panels can occur during various processes, such as machining, measurement and, generally, at any time when it is necessary to have a temporarily precise and stable alignment for at least that part of the panel on which work is being performed.

SUMMARY OF THE INVENTION

To this end, the object of the invention is a method for locally gripping and holding a thin, flexible panel, in particular a panel of complex shape, notably nondevelopable, the method comprising the steps of:

placing a first surface of the panel against a three-point support system without deforming the surface; applying a plurality of suction cups which are mobile with respect to a reference support onto the surface in an area of the surface to be supported; locking each suction cup in a gripping position with respect to the support without locally deforming the surface of the panel.

According to another step of the method, the position of each suction cup with respect to the support is measured in order to calculate the actual shape of the area of the surface of the panel in reference to said suction cups.

A further object of the invention is a device for implementing the aforesaid method, including a turntable support carrying three positioning stops arranged in a triangle and numerous suction cup devices that are uniformly distributed in the space between the stops, with each device including a suction cup mounted so that it can slide perpendicular to the turntable, and means for applying the suction cup against the face of the panel, applying a vacuum to the suction cup and then locking the suction cup in a seizing position without locally deforming the aforesaid panel.

According to another characteristic of the device, a sensor measuring the position of the suction cup with respect to the aforesaid turntable support is associated with each suction cup device.

Once all the suction cups are locked in position with respect to the support turntable, the unit comprises a fixture for holding the panel part that is adjacent to the turntable under isostatic conditions, which can be employed as a useful reference for various operations requiring stable positioning, without applying stress, at least in the area where the suction cups are applied, as well as providing precise knowledge of the real shape of the surface of the panel in reference to the suction cups.

BRIEF DESCRIPTION OF THE DRAWINGS

Other characteristics and advantages will emerge from the following description of an implementation of the device of the invention. The description is provided only as an example and refers to the attached drawings, in which.

DETAILED DESCRIPTION OF THE DRAWINGS

Figure 1:
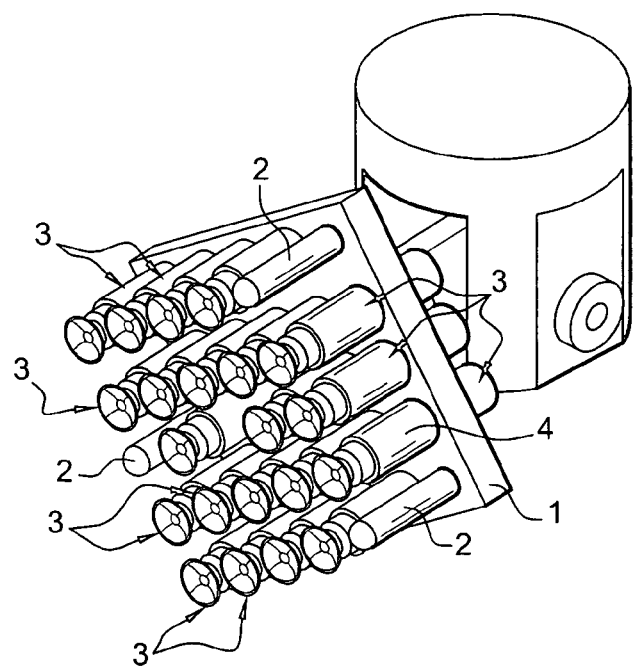
FIG. 1 is a perspective view of a position-holding device according to the invention.

FIG. 1 shows a device for localized gripping and holding of a panel according to the invention.

The device includes a turntable support 1, for example having a square shape, 500 mm on a side. Three fixed stops 2 are protrudingly arranged in a triangle on the side facing the panel that is to be seized with a plurality of uniformly distributed suction cup devices 3, with the set of elements 2 and 3 covering the entire surface of the turntable 1.

The stops 2 are rectilinear locating pins of the same length, with spherical ends, and are positioned perpendicular to the turntable 1.

The stops 2 are preferably as distant as possible from each other and, as shown by FIG. 1, positioned so that two are at two corners of the turntable 1 and the third is in the middle of the opposite side of the turntable 1.

The suction cup devices 3 are preferably uniformly distributed and aligned over the entire remaining surface of turntable 1, parallel to the stops 2, with a constant space of less than 150 mm between the devices 3.

Each device 3 (FIGS. 1 to 3) includes an axially mobile sleeve 4 mounted on the turntable 1 and in which a centering pin 5 is fitted with a suction cup 6 at its end slides.

The sleeve 4 is moved by a drive-lock mechanism including a motor 7 which actuates a ball screw spindle 8 fixed in the turntable 1 by a bearing, a nut 9 engaging the screw 8 and an anchoring device 10 coupled to the nut 9 and having jaws 11 that when separated flatten against the inside wall of the sleeve 4, thus coupling the sleeve 4 with the nut 9.

Figure 4A:
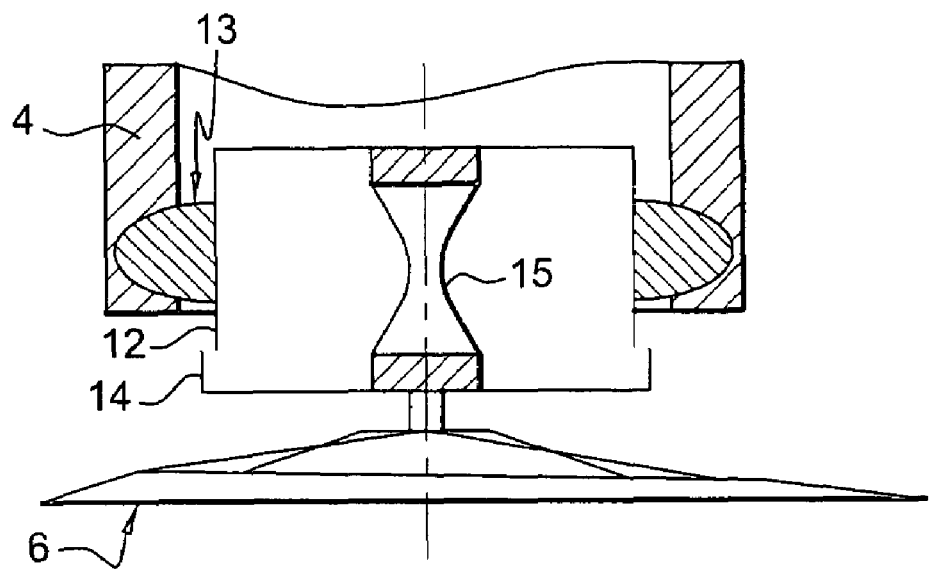
FIGS. 4a and 4b illustrate operation of the suction cup device.

The sleeve 4 carries the centering pin 5 and an aspiration device at its end, the aspiration device comprising (FIGS. 4a, 4b) a sleeve 12 connected to the sleeve 4 by a ball-and-socket joint coupling 13 and closed by a cover 14 which is axially mobile relative to the sleeve 12 by means of a pneumatic diaphragm 15 capable of contracting (FIG. 4b) or expanding (relaxation, FIG. 4a).

Figure 2:
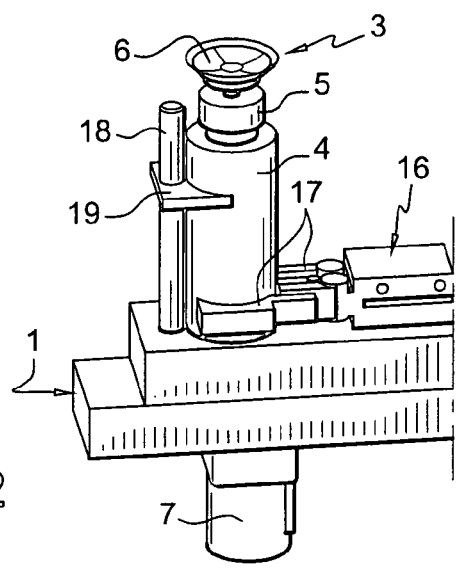
FIG. 2 is a view of a suction cup device.
Figure 3:
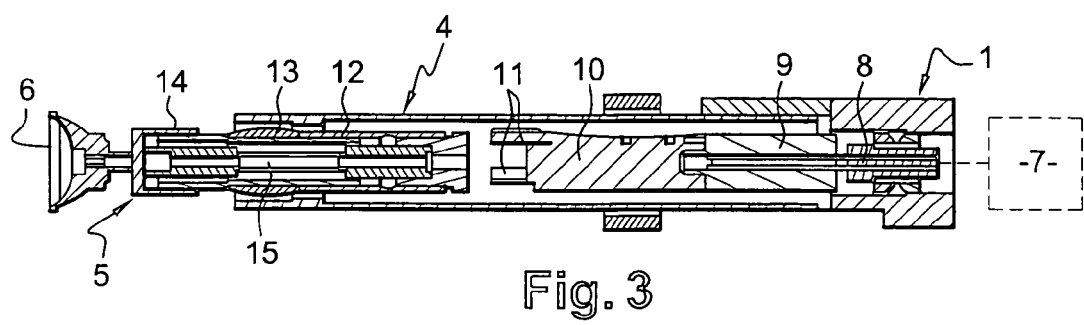
FIG. 3 is an axial cross-section of the device of FIG. 2.

Item 16, in FIG. 2, represents a device for locking the sleeve 4 with respect to the turntable 1. The device 16 is fixed on the turntable 1 and encloses the sleeve 4 with two arms 17.

Item 18 represents a sensor measuring the distance separating it from the adjacent surface of the panel, i.e. the separation of the suction cup 6 from the turntable 1.

The sensor 18 is held lateral to the sleeve 4 by a leg 19.

The following is the operation of the device described above.

Figure 5:
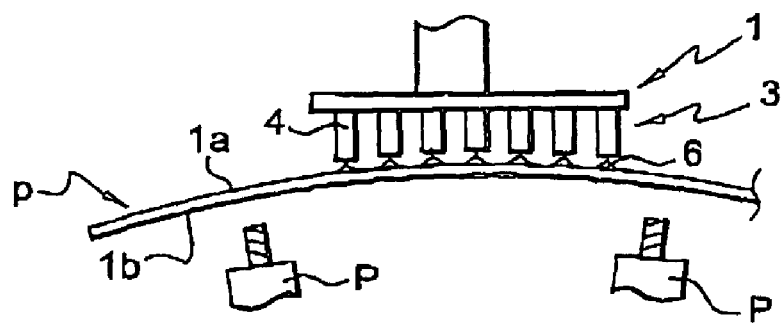
FIG. 5 is a diagram illustrating the application of a device of the invention onto a surface of a panel having a double curvature.

The panel that is to be held, for example the panel p (FIG. 5), is first brought into contact, for example at its convex surface 1a, with the three stops 2 of the device of FIG. 1 without deforming the panel p, by any suitable means, for example by actuating arms P in FIG. 5 acting against the concave face 1b in the direction of the turntable support 1 of the device.

Once contact is established, an initial positioning (step 20, FIG. 4c) of the suction cup devices 3 is accomplished via the actuating motor 7 of the devices 3.

Once the jaws 11 of the fixing device 10 are allowed to expand and the arms 17 of the device 16 are loosened, rotation of the screw 8 causes a translational displacement of the sleeve 4—centering pin 5 unit in the direction of the surface 1a of the panel p.

Once the sleeve 4 has made contact with the surface 1a, with this position being detected by sensor 18, the motor 7 is turned off and the arms 17 are tightened by the immobilizing device 16, thus fixing the position of the sleeve 4 with respect to the turntable 1.

The next step (step 21, FIG. 4c) is the depressurization of the suction cup unit 6. The panel p, which is thus "suctioned," is fixed against the bottom of the suction cups 3. The panel p, having been displaced with respect to the theoretical position of the panel p, is locally subjected to stress.

The diaphragms 15 (FIG. 4a) are then relaxed (step 22, FIG. 4c) so that the panel p regains its stress-free shape by elastic recovery while the cover 14 disengages from the sleeve 12.

The suction cup 6 is then stuck against the panel p and the assembly 6 and 14 is supported by the (vacuum-induced) elasticity of the pneumatic diaphragm 15. Because of their inherent low weight and of their being supported by the elasticity of the muscle 15, the aforesaid elements 6 and 14 do not act or hardly act on the panel p (step 23, FIG. 4c).

All of the centering pins 5 are thus simultaneously disengaged from their sleeves 4.

The next step comprises re-rigidifying the unit 1-3, with the panel p having regained its natural shape without being stressed.

The operation will, at this point, be performed one suction cup 6 at a time so as not to deform the panel p.

Figure 4B:
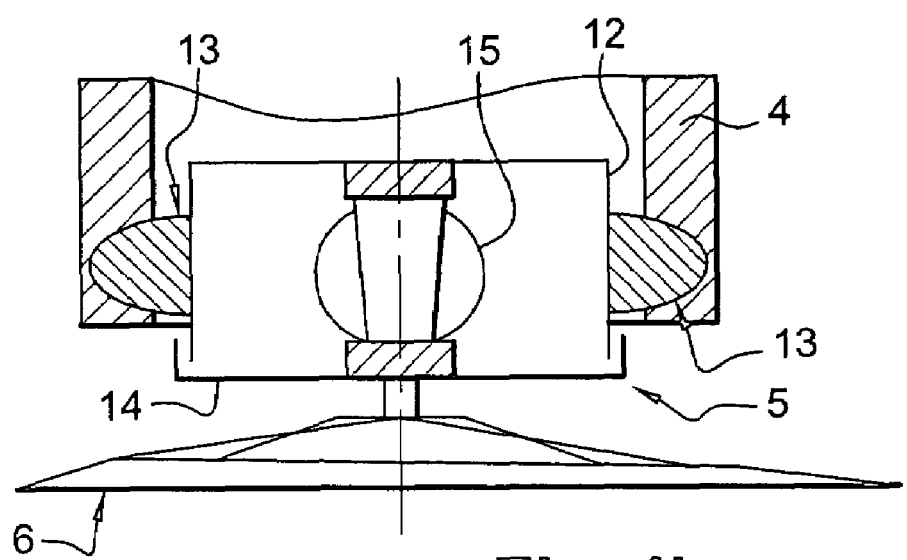
Figure 4C:
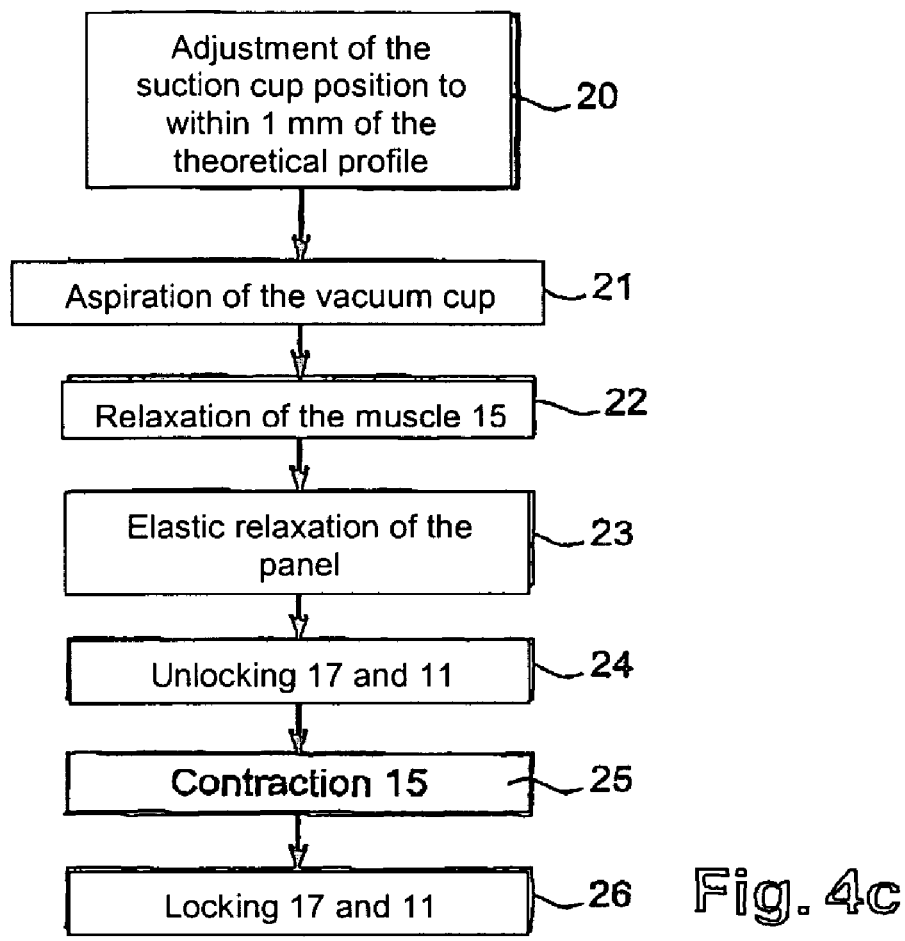
FIG. 4c is a flow chart of operation of the suction cup device.

Thus, for each device 3, the sleeve 4 will be released (step 24, FIG. 4c) externally by loosening the arms 17 and the jaws 11 will be retracted so as to release the sleeve 4 internally. By re-contracting (step 25, FIG. 4c) the diaphragm 15, the unit 5-4 approaches the panel p and the sleeve 12 is again enclosed by the cover 14 (FIG. 4b).

The last step (step 26, FIG. 4c) comprises re-immobilizing the sleeve 4 with respect to the turntable 1, via the jaws 11 of the device 10 and the arms 17 of the device 16.

Thus all of the devices 3 are operated successively.

The panel p is, at right angles to the turntable 1, perfectly immobilized in a stable manner, without deformation or stress on the panel, and it is also possible to determine the real shape of the surface 1a with respect to the turntable 1 by performing a calculation based on the measurements provided by the sensors 18, which yields the precise position of the surface 1a with respect to the turntable 1 at right angles to each suction cup device 3. A calculation by interpolation based on these measurement points makes it possible to determine the real shape of the surface 1a.

As can be seen from FIG. 5, the sleeves 4 of the devices 3 project more or less from the surface of the turntable 1 facing the panel p because of the panel p's curvature.

The set of suction cups 6 adapts automatically to the shape (convex or concave) of the panel p. The device as represented in FIG. 1 can be installed on a multi-axis manipulator and for example integrated with a machining device.

Figure 6A:
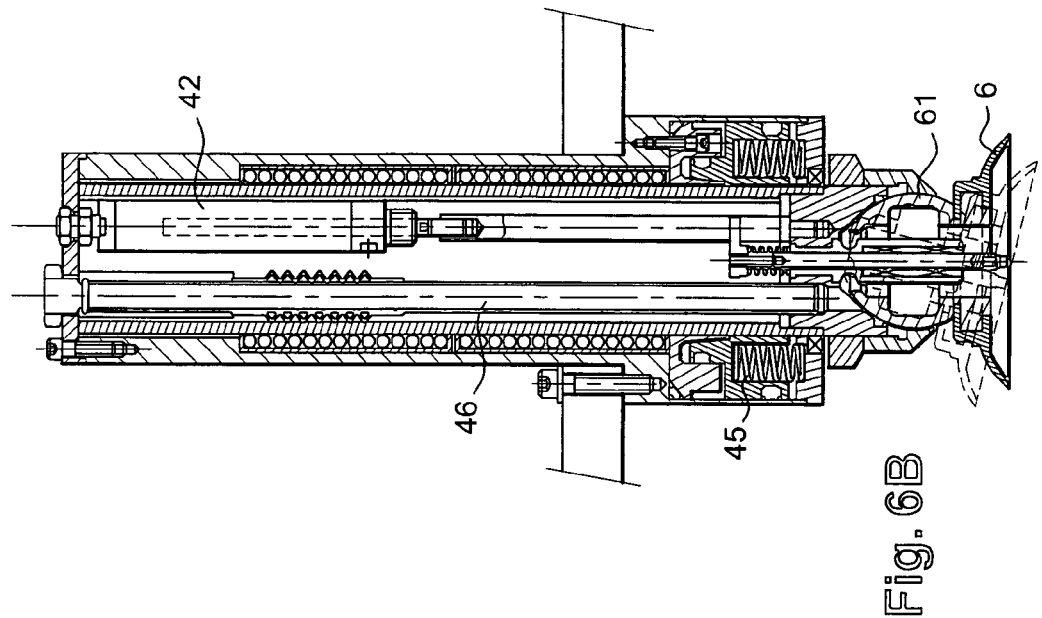
FIGS. 6A and 6B are cross-sectional views of a suction cup device of a holding fixture according to the invention.
Figure 6B:
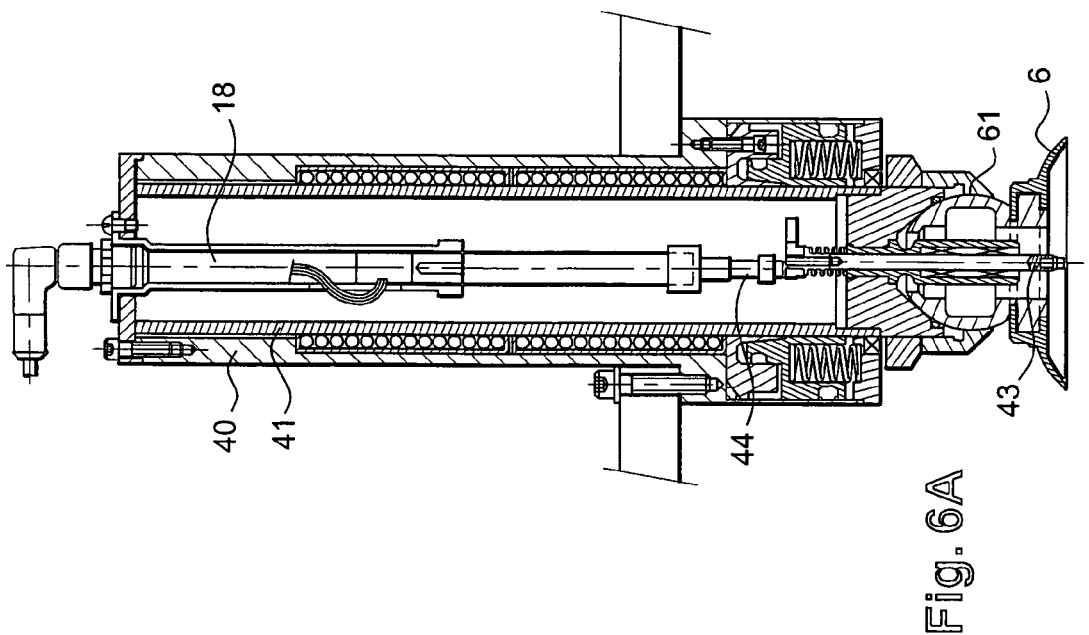

An example of a suction cup device which is more particularly shown in FIGS. 6A and 6B in the context of a variant of this invention, which allows the panel to be gripped in four phases, including docking, locking the sleeves of the suction cup devices in position; device by device relaxation to yield an elastic relaxation of the stress-free panel; and then re-locking the panel device by device so as to again rigidify the assembly.

For purposes of docking, the suction cup device according to this example comprises a guide 40 which slides a sleeve 4 carrying the suction cup 6, which is installed on a ball-and-socket joint 61 in FIG. 6A.

The sleeve 4 is actuated by a jack 42 so as to exit from the guide 40 during the docking phase, until it arrives at a contact point 43 with the panel, with this contact point establishing contact with a sensor that is combined with the displacement sensor 18 of the suction cup, which commands the displacement of the sleeve 4 to stop. A locking device 45 then locks the sleeve in position, which fixes the position of the sleeve 4 on the guide 40 while opposing the force applied by the jack 42, whose thrust is selected to be lower than the force applied by the locking device.

A vacuum is then applied to the suction cup 6 by using the vacuum line 46 to stick the lips of the suction cup onto the panel.

The docking phase takes place simultaneously for all of the suction cups that touch the panel and once this phase is finished all of the jacks 42 are exposed to ambient air so that they no longer exert any force on the sleeves.

Once the docking phase is finished, a suction cup by suction cup reorientation of the supports as shown in FIG. 6B is performed by increasing the vacuum in each suction cup separately, which exerts traction on the panel, and by loosening the hold by the locking device 45. The suction cup and its ball-and-socket joint are then reoriented while tracking the elastic return of the panel during its relaxation.

Once the suction cup by suction cup relaxation sequence is finished, the sleeves 41 are again locked in the guides 40 so as to hold the panel and the ball-and-socket joint 61 is locked by applying a depressurization between the ball-and-socket joint and its seat.

By using sensors 18 to measure the location of the suction cup, a measurement of the shape of the panel is performed once the relaxation has been completed.

This invention applies to any panels in the broad sense defined above, regardless of their constitutive material, such as metal or a composite material, and regardless of the manufacturing process.

The invention claimed is:

1. A method for localized gripping and holding of a thin, flexible panel having a complex, nondevelopable shape, the method comprising:

placing a first surface of the panel against a three-point support system on a table support without deforming the first surface;

applying a plurality of suction cups which are mobile with respect to the table support onto the first surface in an area of the first surface to be supported;

locking each suction cup in a gripping position with respect to the table support;

measuring the position of each suction cup with respect to the table support;

calculating a real shape of the area of the surface of the panel being held by the suction cups;

unlocking the suction cups in position; and re-locking each suction cup in the gripping position without causing a local deformation of the first surface of the panel.

2. The method of claim 1, further comprising reorienting the suction cups by applying a depressurization between the suction cup and the panel during of the step of unlocking the suction cups.

3. The method of claim 1, wherein unlocking said suction cups comprises releasing support elements between said suction cups and said table support while said suction cups are gripped to the panel.

4. A device for localized gripping and holding of a thin, flexible panel having a complex, nondevelopable shape, comprising:

a turntable support having three positioning stops triangularly arranged thereon;

a plurality of suction cup devices distributed uniformly between the positioning stops, each suction cup device including a suction cup mounted to slide perpendicularly to the turntable support; and means for applying the suction cup against a surface of the panel;

means for applying a vacuum to the suction cup; and means for locking the suction cup in position to hold the panel without causing a local deformation of the panel wherein said means for applying the suction cups comprise a drive-lock mechanism and wherein said means for locking the suction cups include means for locking and releasing support elements of the suction cups in translation and orientation.

5. The device of claim 4, further comprising a sensor associated with each suction cup device for measuring a location of the suction cup with respect to the turntable support.

6. The device of claim 4, wherein the means for applying each suction cup includes first releasable means for translational displacement of a sleeve and second releasable means for locking the displacement of the sleeve.

7. The device of claim 6, further comprising a sliding centering pin in the sleeve connected to the suction cup by a diaphragm.

8. The device of claim 6, further comprising a ball-and-socket joint interposed between each suction cup and sleeve, whereby each suction cup is reorientable.

9. The device of claim 6, wherein each suction cup is associated with a contact detector for detecting contact with the panel.

* * * * *